(12) United States Patent
Aust et al.

(10) Patent No.: US 8,499,074 B2
(45) Date of Patent: Jul. 30, 2013

(54) METHOD AND APPARATUS FOR ACCESSING FILES STORED IN A STORAGE ACCESS NETWORK (SAN) OR NETWORK ATTACHED STORAGE (NAS)

(75) Inventors: Matthias Andreas Aust, Hannover (DE); Eduard Siemens, Sehnde (DE); Stefan Kubsch, Hohnhorst (DE)

(73) Assignee: Tixel GmbH, Hannover (DE)

( * ) Notice: Subject to any disclaimer, the term of this patent is extended or adjusted under 35 U.S.C. 154(b) by 427 days.

(21) Appl. No.: 12/954,265

(22) Filed: Nov. 24, 2010

(65) Prior Publication Data
US 2011/0131322 A1 Jun. 2, 2011

(30) Foreign Application Priority Data
Nov. 27, 2009 (EP) .................................... 09306149

(51) Int. Cl.
*G06F 15/16* (2006.01)
(52) U.S. Cl.
USPC ............................ 709/224; 370/228; 707/655
(58) Field of Classification Search
USPC ............................ 709/224; 370/228; 707/655
See application file for complete search history.

(56) References Cited

U.S. PATENT DOCUMENTS

| 6,775,230 | B1 * | 8/2004 | Watanabe et al. ............. 370/228 |
| 7,275,103 | B1 * | 9/2007 | Thrasher et al. ............. 709/224 |
| 2002/0138642 | A1 | 9/2002 | Miyazawa et al. |
| 2006/0010233 | A1 | 1/2006 | Fellenstein et al. |
| 2006/0223524 | A1 * | 10/2006 | Ginzburg ..................... 455/424 |
| 2006/0242156 | A1 | 10/2006 | Bish et al. |
| 2006/0277383 | A1 | 12/2006 | Hayden et al. |
| 2007/0043854 | A1 | 2/2007 | Shum et al. |
| 2010/0082840 | A1 * | 4/2010 | Beeston et al. ............... 709/238 |

OTHER PUBLICATIONS

Carter et al. Measuring bottleneck link speed in packet-switched networks. pp. 217-318. 1996.*
European Search Report dated May 5, 2010 for related European Application EP 09 30 6149.

* cited by examiner

*Primary Examiner* — Jeffrey R Swearingen
*Assistant Examiner* — Bryan Lee
(74) *Attorney, Agent, or Firm* — Howard IP Law Group, P

(57) ABSTRACT

A method and apparatus for file access in a storage access network (SAN) wherein a portion of a first file is accessed and an access rate computed based on time and amount of data accessed. If the computed access rate is less than an expected rate, a problem is identified and analysis performed. A first analysis accesses the first file through a second link to determine if the link is the problem. If the first file is accessed at an expected rate, the first link is identified as the problem and the file is accessed through an alternate link. A second analysis accesses a second file through the first link. If the second file is accessed at an expected rate, the first file is identified as the problem and the second file is accessed through the first link.

10 Claims, 3 Drawing Sheets

US 8,499,074 B2

METHOD AND APPARATUS FOR ACCESSING FILES STORED IN A STORAGE ACCESS NETWORK (SAN) OR NETWORK ATTACHED STORAGE (NAS)

FIELD OF THE INVENTION

This invention relates to accessing files stored in a storage access network (SAN).

BACKGROUND OF THE INVENTION

In video and film production environments, high resolution video material needs to be stored, processed and transferred over high speed networks. In order to achieve the necessary throughput for file access, storage area networks (SAN) may be used for storage. One example is network attached storage (NAS). In many cases, the ability to access the file system very efficiently is crucial. Some applications require very high data rates: e.g. streaming or copying of 2 k video material in real-time can result in data rates around 1.6 Gigabits per second (1.6 Gbps), and 4 k video material up to 10 Gbps, depending on factor such as frame rate, color depth, and/or other such parameters. US Patent Application Publication No. 2006/010233A1 provides a solution for determining the throughput of a SAN, using a set of software tools to be installed on one or more computer systems that share access to a SAN. The software tools coordinate loading, testing and measurement of storage throughput on the shared data storage system, and further coordinate the collection, storage and presentation of result data obtained through such loading, testing and measurement. However, the RAN needs to be configured in a maintenance mode, and actual data traffic is only simulated. Further, the results are presented for human service personnel to make judgments and react, thereby requiring human intervention, for example, to locate bottlenecks and service the system.

In view thereof, it would be desirable to have a storage system that during normal operation, autonomously determines and handles file access problems in SAN or NAS storage systems, and provides smart solutions for these problems, thereby allowing reliable and substantially continuous access at a high data rate.

SUMMARY

In one embodiment, an improved mechanism to access SAN or NAS based storage systems, and particularly systems that can be simultaneously accessed by multiple accessing threads through multiple links is provided. Particularly in cases where network link problems or file system problems exist, these problems may be detected and handled very efficiently.

According to an embodiment of the invention, a method for accessing files stored in a SAN or NAS based storage system has, in principle, an access rate determining phase and an access phase. During the access rate determining phase, an initial portion of a file is accessed through a particular link by reading or writing and an access rate is measured, and during the access phase, either the remainder of the file is accessed through the link or through another link, or another file is accessed through the particular link.

According to one aspect, a monitoring function is provided for determining access performance, and/or a monitoring history function is provided in order to detect changes in access performance.

According to another aspect, access to a file begins with an access rate determining phase. During this phase, an initial portion (of given data size, for example, 1 Kilobyte (1 kB), 10 kB, and the like, or of given access duration, for example, 1 ms (1 millisecond), 1 μs (microsecond), and the like) of a file is accessed by reading or writing. The required time or the data amount is measured, and an access rate is calculated. The access rate is compared with an expected value, obtained for example, from history as obtained by the monitoring and/or obtained from current configuration settings. If the calculated access rate is too low, an analysis procedure is initiated, and depending on the result of the analysis procedure, access to the file is re-scheduled to a later point in time or to another access link.

In one embodiment, the initial portion of data read during the access rate determining phase is only used for measuring system performance. According to the measured system performance, it is determined automatically whether or not a current file will be accessed, and whether or not it will be accessed through a current link. In another embodiment, the initial portion of data is output together with the remaining portion of the file, when the calculated access rate for the initial portion is in accordance with the expected value of the access rate.

In one embodiment, each thread has a given link assigned. In another embodiment, threads are flexible with respect to links. In one embodiment, each link can have a maximum number of threads assigned that may simultaneously use the link.

In one embodiment, it is determined (based on the monitoring), whether the probability for file system problems is higher or lower than the probability of link access problems. Depending on the result, the first alternative for remedying the file access problem is determined.

A method and apparatus for file access in a storage access network (SAN) identifies problems automatically taking corrective action maximizing access rates. A portion of a first file is accessed and an access rate computed based on time and amount of data accessed. If the computed access rate is less than an expected rate, a problem is identified and analysis performed. A first analysis accesses the first file through a second link to determine if the link is the problem. If the first file is accessed at an expected rate, the first link is identified as the problem and the file is accessed through an alternate link. A second analysis, accesses second file is accessed through the first link. If the second file is accessed at an expected rate, the first file is identified as the problem and second file is accessed through the first link.

A method for accessing files stored in a storage access network (SAN), wherein the files may be accessed through at least two different links to the storage access network, the method comprising the steps of: accessing a first portion of a first file through a first link; determining a time for accessing the first portion of the first file and an amount of accessed data for the first portion of the first file; comparing the determined time, the determined data amount or an access rate calculated from the determined time and determined data amount, with an expected value; if the difference from the comparing step exceeds a predetermined threshold indicative of an unexpected long time, a low data amount or a low access rate, performing an analysis, the analysis comprising a first or a second analysis procedure, wherein the first analysis procedure comprises the steps of: accessing the first portion of the first file through a second link and determining the time, amount of data or access rate for the accessing the first portion of the first file through the second link; determining whether accessing the first portion of the first file is faster through the second link than through the first link, wherein: if the accessing the first portion of the first file is faster through the second link, accessing the first file through the second link, and marking the first link as not preferable; and if the accessing the first portion of the first file is not faster through the second link, accessing a second file through the first link, and marking the first file as currently not accessible; and wherein the second analysis procedure comprises the steps of: accessing a first portion of a second file through the first link, and determining the time, amount of data or access rate for accessing the first portion of the second file through the first link; determining if accessing the first portion of the second file through the first link is faster than accessing the first portion of the first file through the first link, wherein: if accessing the first portion of the second file through the first link is faster, accessing the second or a further file through the first link, and marking the first file as currently not accessible; and if accessing the first portion of the second file is not faster, accessing the first file through a different link than the first link, and marking the first link as not preferable. In one embodiment, the first portion of the first file has a predetermined data size, and the time for accessing the first portion of the first file is predetermined. A time to access the first portion of the first file has a predetermined minimum duration, and the data amount during the accessing is predetermined. The expected value may be obtained from at least one previously determined time for accessing a predetermined data amount of a file through the first link, or from at least one previously determined data amount for a file accessed during a specified time through the first link, or from at least one previously obtained access rate for accessing a file through the first link. In one configuration, on the condition that the difference from the comparing step does not exceed the predetermined threshold, then the first file accessed through the first link continues with the remaining portion of the first file. The method further comprises a step of determining whether link problems or file system problems appear more frequently, and based on the determination, performing either the first or the second analysis procedure. In one configuration, if link problems appear more frequently, the first analysis procedure is performed, and if file system problems appear more frequently, the second analysis procedure is performed. The method further includes accessing files by a plurality of software threads, wherein each thread accesses one file, and further comprises a step of assigning each thread an associated link at the time of its execution. In one configuration, all file accesses are read accesses. In another configuration, all file accesses are write accesses. In one configuration, the step of accessing the first file through the second link, on a condition that the first link is not preferable and the step of accessing the first file through a different link than the first link on a condition that the first link is not preferable may be write accesses, and the other file accesses may be read accesses.

An apparatus for accessing files stored in a storage access network (SAN), wherein the files are accessed through at least two different links to the storage access network, comprises a first accessing module configured to access a first portion of a first file through a first link; a processor configured to determine the time for accessing the first portion of the first file and an amount of data accessed for the first portion of the first file; a comparator configured to compare the determined time, the determined amount of data or an access rate calculated from the determined time and determined data amount, with an expected value and provide an output indicative of the comparison; an analyzer configured to analyze if the output exceeds a predetermined threshold indicative of an unexpected long time, a low data amount or a low access rate, the analyzer comprising a first or second analysis module, wherein the first analysis module comprises: a second accessing module configured to access the first portion of the first file through a second link and a second processor for determining the time, amount of data or access rate for the accessing the first portion of the first file through the second link; a second comparator configured to determine whether accessing the first portion of the first file is faster through the second link or through the first link; a third accessing module configured to access the first file through the second link on a condition that the accessing the first portion of the first file is faster through the second link, and a first marker for marking the first link as not preferable; and a fourth accessing module for accessing the second file through the first link if the accessing the first portion of the first file is not faster through the second link, and a second marker for marking the first file as currently not accessible; wherein the second analysis module comprises: a fifth accessing module configured to access a first portion of a second file different from the first file through the first link, and a third processor configured to determine the time, amount of data or access rate for accessing the first portion of the second file through the first link; a third comparator configured to determine whether the accessing the first portion of the second file or the accessing the first portion of the first file is faster through the first link; a sixth accessing module configured to access the second or a further file through the first link if the accessing the first portion of the second file through the first link is faster, and a third marker for marking the first file as currently not accessible; and a seventh accessing module configured to access the first file through a different link than the first link if the accessing the first portion of the second file is not faster, and a fourth marker for marking the first link as not preferable.

A fourth processor may be configured to determine whether link problems or file system problems appear more frequently, and a fifth processor may be configured for determining, whether to perform the first or the second analysis procedure. If it is determined that link problems appear more frequently, the first analysis module is used prior to the second analysis module, and if file system problems appear more frequently, the second analysis module is used prior to the first analysis module. In one configuration, the file accessing may be performed by a plurality of software threads, wherein each thread accesses one file. An associating module is configured for assigning each thread an associated link at the time of its execution.

BRIEF DESCRIPTION OF THE DRAWINGS

Exemplary embodiments of the invention are described with reference to the accompanying drawings, in which.

DETAILED DESCRIPTION

In the following, an embodiment of the invention is described in an exemplary manner. The invention provides an improved mechanism to access, in this embodiment, a ONEFS® based storage system. Especially in case of network link or file access problems, such problems can be detected and handled very efficiently.

Figure 1:
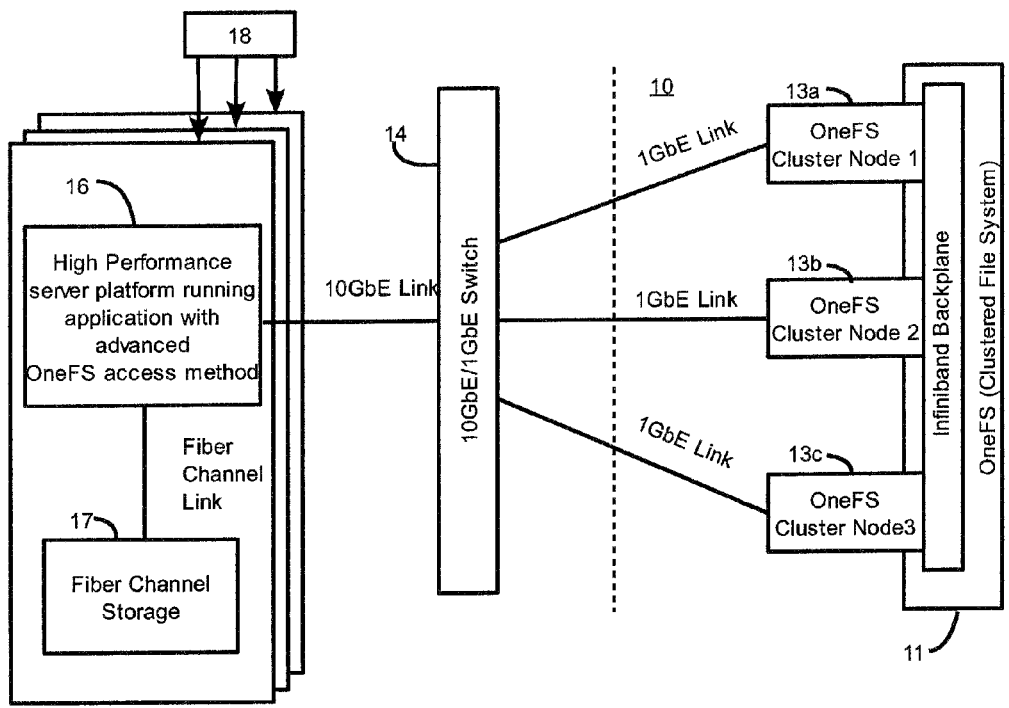
FIG. 1 is a block diagram showing an exemplary clustered storage system with multiple devices connected via a backplane.

FIG. 1 shows a high performance file access system, for example, a ONEFS based clustered storage system 10 comprising multiple storage devices 13a,13b,13c. The storage devices 13 may contain one or more hard-drives each (not shown), and are connected via a fast backplane 12. In an exemplary embodiment, a backplane configured according to a high performance data communication standard, such as INFINIBAND™ may be used. The devices 13 run a ONEFS clustered file system 11, and each device 13 exports an network file system (NFS) or common Internet file system (CIFS) mount point, for example, via 1 Gbps Ethernet link. The links may be bundled in a switch 14 located inside or outside the actual storage system 10, before they are exported to a client 15, or plurality of clients. Each exported directory points to the same underlying physical data. In order to achieve maximum throughput, each link may be used in parallel (i.e. simultaneously) to access the file system. In other words, the clustered storage system 10 together with the switch 14 provides multiple simultaneous accesses to the files. This includes access to virtual copies of the files. Each device's NFS share is imported to a client device 15 under a different name. The client's application 16 ensures that all imported file systems (which are mounted to different directories) are simultaneously accessed in order to achieve a maximum throughput.

An embodiment of the invention is described in detail according to the following exemplary setup. Clustered storage devices, for example, as shown 3 ISILON® clustered storage devices 13a-13c, running under the ONEFS file system, are connected via 1 Gb Ethernet link, also denoted as 1 GbE, to an Internet Protocol (IP) network. The backplane 12 is interconnected via a backplane compliant with a high performance communication standard such as INFINIBAND. Large directories containing up to several thousand files are copied from one file system to another file system, whereby in this embodiment, at least one of these file systems is a clustered ONEFS system 11 accessed via NFS. In one example, the files are digital moving picture exchange (DPX) formatted digital image files of a size of 8-50 Mbytes (Megabytes) each, as used in movie creation and distribution environments.

Thus, each ISILON device 13a-13c exports the content of the same ONEFS directory. Therefore, a client device 15 may "see" and access the same ONEFS content via different NFS mount points (e.g. /oneFs1, /oneFs2, /oneFs3), and may read and write to the same clustered file system 11 via these mount points. Each of the mount points represents a separate different network connection (such as a 1 Gbps link). In order to achieve maximum throughput when reading or writing to the clustered file system 11, the client 15 may access the storage system through all three links simultaneously, (i.e. reading or writing 3 files at the same time). In such a shared file system it may occur that one file of a DPX sequence may only be accessed at a reduced bandwidth. This may be due to several causes. Typical examples include: the file to be accessed is stored on a hard disk drive (HDD) that has failures; that the network link that is used to access the respective file experiences failures or is overloaded. While, depending on the access strategy of the client, these failures could conventionally cause the entire client application to starve or to hang, an aspect of the present invention provides a solution to this problem.

Figure 2:
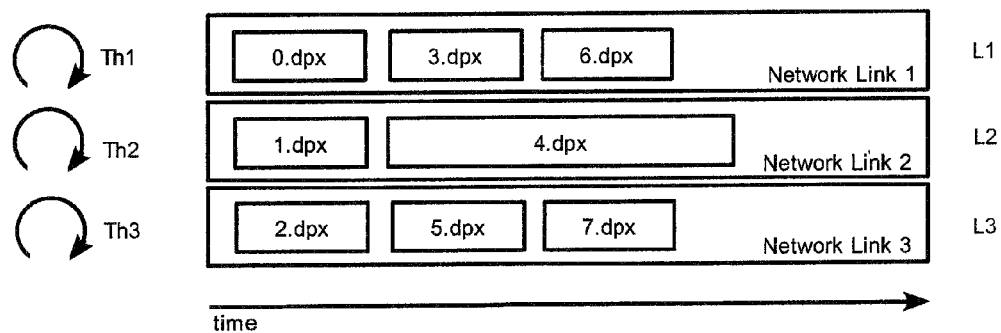
FIG. 2 is a timeline diagram depicting file access problems.

Referring to FIG. 2, a timeline diagram is shown depicting an architecture in which one thread is used per network link. A typical situation in a conventional system is as follows. When a client application uses one thread per network link, the file access pattern shown in Table 1 may result. In case of a file access problem involving the file 4.dpx within the storage cluster, thread Thread2 would be blocked for that time and the entire link to mount point /oneFS2 would not be usable by the application until the file operation returns. Thus, the overall throughput would be reduced by 33% during that period of time. FIG. 2 depicts this scenario on a time line. If access to file "4.dpx" is impaired by errors on the block device, only Thread1 and Thread3 continue to access files, and thus only network links 1 and 3 (L1,L3) are used for data acquisition or data storage.

TABLE 1

| Thread1 | /oneFs1/0.dpx |
| Thread2 | /oneFs1/1.dpx |
| Thread3 | /oneFs1/2.dpx |
| Thread4 | /oneFs1/3.dpx |
| Thread5 | /oneFs1/4.dpx |
| Thread6 | /oneFs1/5.dpx |
| Thread7 | /oneFs1/6.dpx |
| Thread8 | /oneFs1/7.dpx |
| ... | ... |

That is, conventionally in the above described scenario, the overall throughput is reduced by 33%, although all network links are fully functional and other files of the list may still be accessed without problems.

Figure 3:
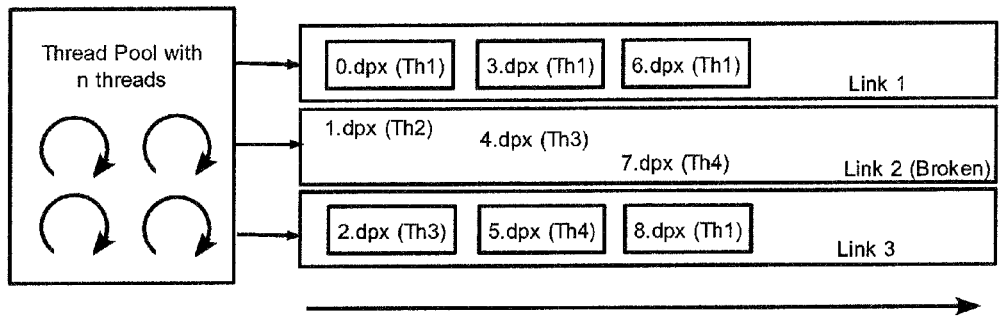
FIG. 3 is a timeline diagram depicting multiple threads of a thread pool attempting to access a file over a broken link.

Another conventional access strategy exhibiting significant drawbacks. Is shown in a timeline diagram of FIG. 3 of an architecture in which a pool of threads subsequently or sequentially accesses a list of files, as in the right column of Table 1. This results in a blocked application when a network link is broken, since at some point in time each thread (Th1, Th2, Th3, Th4) of the pool attempts to access a file over the broken link and is thus blocked. However, a disturbed or broken file does not lead to an unusable network link, as described with respect to FIG. 2, if there are more threads in the pool than available network links.

According to an aspect of the present invention, an access method described herein avoids the drawbacks of conventional methods by splitting the file list into a list of access paths to the files and a plain list of files. An example is shown in Table 2 which contains a list of access paths and Table 3 containing a list of files. The full path is assembled during runtime, and the files are accessed by a thread pool. The number of threads in the pool is determined carefully to achieve maximum throughput, since the throughput decreases significantly if too many threads access the file system simultaneously.

TABLE 2

| /oneFs1 |
| /oneFs2 |
| /oneFs3 |

In order to control the access of the different links through the different network shares, a token based mechanism may be applied. During normal operations, when no network or file system problems have occurred, it is ensured that only a limited number of threads are permitted to use a certain link at a time. After performance issues are detected, the exclusiveness of access may be relaxed by a control thread, as described below, to detect the bottleneck and potentially take preventive actions.

TABLE 3

0.dpx
1.dpx
2.dpx
3.dpx
4.dpx
5.dpx
. . .

In one aspect, at the beginning of a file access, an access rate measurement is performed. For this purpose, a small part or portion of the file (e.g. a few kilobytes) is read or written over a current link. The access time to this small data sample or chunk is measured. After reading or writing this part of the file, the access rate over the currently used link is determined by dividing the sample size by the access time. In one embodiment, a log of determined read/write rates via network links is maintained.

In one embodiment, if it is determined that the obtained access rate is considerably lower than expected, as detected, for example, by comparison of the measured access rate with a previously determined rate of read or write operations, the above-described access rate measurement is repeated on another file over the same link. If access to the second file is also slow, there is a high probability that the network link is the cause of the bottleneck. If the second file may be accessed at the expected access rate, it is more likely that a file system failure is the cause of the long access time of the first file.

If the reason for the degraded performance is due to a problem in the file access, a read/write request to other files may be attempted over the same (i.e. current) link.

If the access to the first portion of the file was successful, (i.e. network and file system throughput are in the expected range), the remaining portion of the file may be read or written using the current link.

The above procedure may be further refined as follows:

According to an embodiment, data rates (or access times) for each link are tracked, so that the calculated throughput, based on the first sample, may be directly compared with the tracked values. In one embodiment, the measurement results can be filtered prior to the comparison. Thus, statistical values such as mean, average and standard deviation of data rates (or access times) may be taken into account and further improve the prediction of expected access times or data-rates.

In another embodiment, if the access rate measurement reveals considerably worse results than expected, a second test may be performed on a previously accessed file, for which good performance results has been tracked. This will further improve the reliability of determining the failure reason.

In another embodiment, a control thread monitors each read/write thread and compares actual access times with estimated access times, obtained from history statistics and/or other information to distinguish and identify file system problems or network link problems according to the above described criteria.

According to an embodiment, if the measured performance of a network link is lower than a certain threshold, the control thread initiates a sample access of another file over the specific link and checks the performance of the link. If the performance is better, it is very likely that a file system issue exists (e.g. a certain block of a file could not be read). Thus, the corresponding network link may still be used to access other files. If the other file access ed over the specific link experiences lower than expected performance, it is very likely that the network link is impaired. The control thread may be configured to prevent wasting of further resources (i.e. threads) on the impaired link by removing the corresponding network share from the path list.

Additionally, a small portion of the file that appears to be experiencing access issues may be accessed over a different link. If the same performance issues are identified, it is very likely that the network link is not the cause of the bottleneck, and the link may still be used to access other files.

Figure 4:
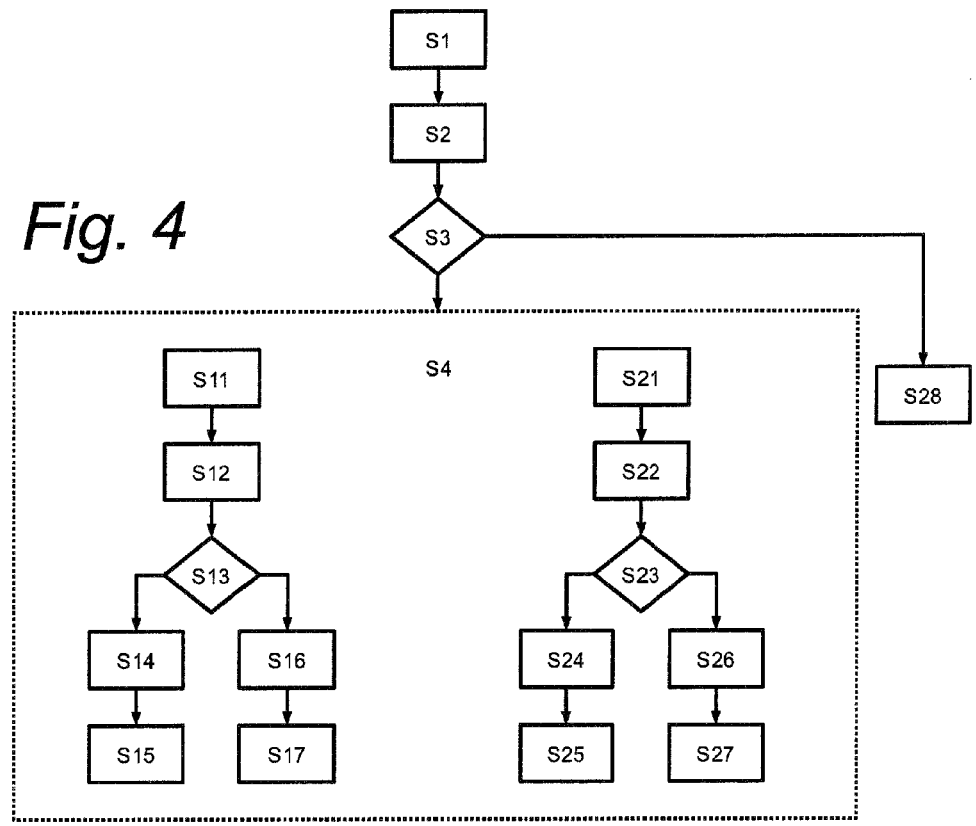
FIG. 4 is an exemplary process flow of a method for accessing files stored in a storage access network (SAN) according to an embodiment of the present invention.

FIG. 4 shows a process flow diagram depicting a method for accessing files stored in a storage access network (SAN). The files may be accessed through at least two different links to the storage access network. In a first step, a first portion of a first file is accessed in a first accessing step S1 through a first link. The time for accessing the first portion of the first file and the accessed data amount of the first portion of the first file are determined S2.

Then, the determined time, the determined data amount or an access rate calculated from the determined time and the determined data amount are compared S3 with an expected value. If the step of comparing yields an unexpected long time, low data amount or low access rate (e.g. if the comparison result yields a value whose magnitude exceeds a predetermined threshold), then an analysis performed S4. Otherwise, accessing the file through the first link may continue S28 with remaining data of the first file. The analysis S4 may comprise at least one out of two different analysis procedures.

A first analysis procedure comprises the following steps:

accessing S11 in a second accessing step the first portion of the first file through a different second link and determining S12 the time, data amount or access rate for said accessing the first portion of the first file through the second link, and determining S13 whether accessing the first portion of the first file is faster through the second link than through the first link.

If said accessing the first portion of the first file is faster through the second link, the first file is accessed S14 in a third accessing step through the second link. In one embodiment, the first link is marked S15 as not preferable. In another embodiment, it is assumed that the first link may recover quickly, and the first link is not marked, so that further applications or clients may use the first link.

If said accessing the first portion of the first file is not faster through the second link, then a different second file is accessed S16 in a fourth accessing step through the first link. In one embodiment, the first file is then marked S17 as "currently not accessible" or similar. In another embodiment, it is assumed that the file system recovers quickly, and the first file is not marked.

A second analysis procedure comprises the following steps:

accessing S21 in a fifth accessing step a first portion of a second file (different from the first file) through the first link, and determining S22 the time, data amount or access rate for accessing said first portion of the second file through the first link, and determining S23 if said accessing the first portion of the second file through the first link is faster than said accessing the first portion of the first file through the first link.

If said accessing the first portion of the second file through the first link is faster, the second or a further file is accessed S24 through the first link, and in one embodiment the first file is marked S25 as "currently not accessible". In another embodiment, the first file is not marked.

If said accessing the first portion of the second file is not faster, the first file is accessed S26 through a different link than said first link, and in one embodiment the first link is marked S27 as "currently not preferable". In another embodiment, the first link is not marked.

If a link is marked as not preferable, other threads may evaluate the mark and react correspondingly, for example, by avoiding the link for a certain time. Likewise, threads may avoid accessing a file that is marked as currently not accessible for some predetermined time period.

In an embodiment, the expected value is obtained from at least one previously determined time for accessing a predetermined data amount of a file through the first link. In other embodiments, it is obtained from at least one previously determined data amount of a file accessed during a specified time through the first link, or from at least one previously obtained access rate for accessing a file through the first link.

Figure 5:
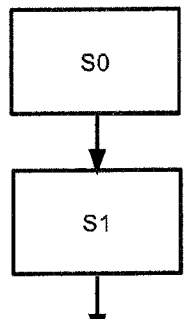
FIG. 5 is a supplemental process flow depicting an initial assignment step.

FIG. 5 is a supplemental process flow diagram that may be implemented in addition to the process depicted in FIG. 4. In an aspect, the method further comprises an initial step S0 of assigning each thread a link at the time of execution. The accessing may be performed by software threads where each thread accesses one file.

Figure 6:
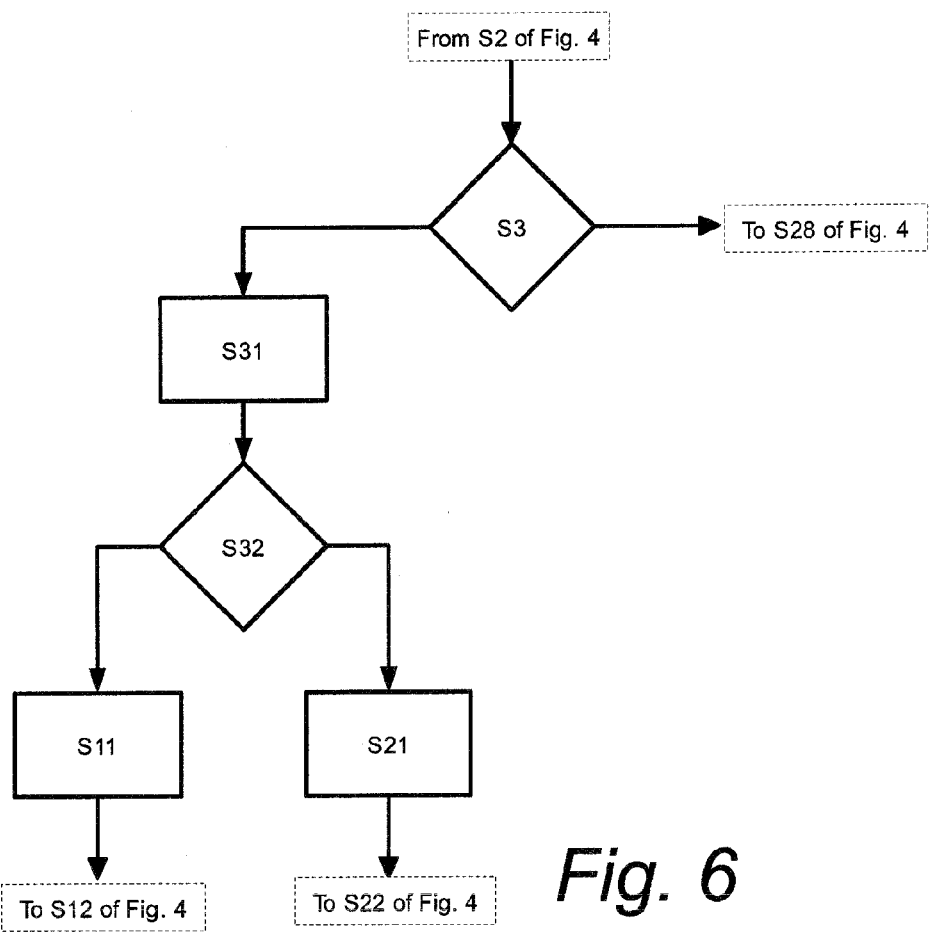
FIG. 6 is a supplemental process flow depicting an additional step of determining whether to perform a first or a second analysis procedure.

FIG. 6 is a supplemental process flow diagram that may be implemented in addition to the process depicted in FIG. 4. In an aspect, the method further comprises a step of determining S31 in an analysis (e.g. statistical analysis) or detection step whether link problems or file system problems appear more frequently, and determining S32 whether to perform the first or the second analysis procedure based on the statistical analysis. If, according to the determining step S31, link problems are experienced more frequently, the first analysis procedure first may be performed first, because it is more likely (e.g. based on prior experience) to find the problem. The second analysis procedure may be performed subsequently.

On the other hand, if based on the determining step S31 file system problems are experienced more frequently, the second analysis procedure is performed first, because it is more likely to find the problem based on previous experience. The first analysis procedure may be performed subsequently.

In one embodiment, the file access method is adaptively switched between two modes: a first mode performing first analysis procedure followed by the second analysis procedure if necessary. A second mode may be defined performing the second analysis procedure followed by the first analysis procedure, if necessary. A control unit (shown in FIG. 1 as 18) controls the switching, based on predefined settings or based on an analysis of system behavior.

For successfully applying the above methods, benefits may be achieved by adapting the storage system to be used by only one application at a time. It is common practice to ensure a certain quality of service (QoS) for file access on the storage system. Concurrent accesses by multiple applications, each of which access multiple files through multiple links, may result in a random access pattern which usually results in degraded throughput as compared to sequential access. Therefore, in one embodiment where multiple applications or clients may access a storage system, a scheduling unit 18 (shown in FIG. 1) is provided to control sequential access of the multiple applications or clients.

In this way, access is provided to a ONEFS based storage cluster and handles network and file system failures while minimally impacting overall performance.

It should be noted that although in the above examples the nodes' operating system and the backplane are shown as ONEFS and INFINIBAND backplane, other types of operating systems and backplane architectures may be constructed other than those mentioned, as would be apparent to those of ordinary skill in the art, all of which are contemplated within the spirit and scope of the invention.

While there has been shown, described, and pointed out fundamental novel features of the present invention as applied to preferred embodiments thereof, it will be understood that various omissions and substitutions and changes in the apparatus and method described, in the form and details of the devices disclosed, and in their operation, may be made by those skilled in the art without departing from the spirit of the present invention.

Further, the present invention is operable with computer storage products or computer readable media that contain program code for causing a processor to perform the various computer-implemented operations as described herein. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network, as described herein for example. Stand-alone computers, client/server systems, or combinations thereof, may be employed.

A system in accordance with the invention may include means corresponding to each step in each method described herein. Each means may be implemented by a processor executing instructions contained in programs which may be stored in a storage medium, such as local memory or data storage in accordance with the foregoing description. It will be appreciated that the steps in the methods in accordance with the invention described herein may be so implemented.

It is expressly intended that all combinations of those elements that perform substantially the same function in substantially the same way to achieve the same results are within the scope of the invention. Substitutions of elements from one described embodiment to another are also fully intended and contemplated. Each feature disclosed in the description and (where appropriate) the claims and drawings may be provided independently or in any appropriate combination. Features may, where appropriate be implemented in hardware, software, or a combination of the two. Where applicable, connections may be implemented as wireless connections or wired, not necessarily direct or dedicated, connections. Reference numerals appearing in the claims are by way of illustration only and shall have no limiting effect on the scope of the claims.

It will be understood that the present invention has been described purely by way of example, and modifications of detail can be made without departing from the scope of the invention.

What is claimed is:

1. A method for accessing files stored in a storage access network (SAN), wherein the files may be accessed through at least two different links to the storage access network, the method comprising the steps of:

accessing a first portion of a first file through a first link;

determining a time for accessing said first portion of the first file and an amount of accessed data for the first portion of the first file;

comparing the determined time, the determined data amount or an access rate calculated from the determined time and determined data amount, with an expected value;

if the difference from the comparing step exceeds a predetermined threshold indicative of an unexpected long time, a low data amount or a low access rate, performing an analysis, the analysis comprising a first or a second analysis procedure, wherein the first analysis procedure comprises the steps of:
  accessing the first portion of the first file through a second link and determining the time, amount of data or access rate for said accessing the first portion of the first file through the second link;
  determining whether accessing the first portion of the first file is faster through the second link than through the first link, wherein:
    if said accessing the first portion of the first file is faster through the second link, accessing the first file through the second link, and marking the first link as not preferable; and
    if said accessing the first portion of the first file is not faster through the second link, accessing a second file through the first link, and marking the first file as currently not accessible;

and wherein the second analysis procedure comprises the steps of:
  accessing a first portion of a second file through the first link, and determining the time, amount of data or access rate for accessing said first portion of the second file through the first link;
  determining if said accessing the first portion of the second file through the first link is faster than said accessing the first portion of the first file through the first link, wherein:
    if said accessing the first portion of the second file through the first link is faster, accessing the second or a further file through the first link, and marking the first file as currently not accessible;
    if said accessing the first portion of the second file is not faster, accessing the first file through a different link than said first link, and marking the first link as not preferable; and determining whether link problems or file system problems appear more frequently, and based on the determination performing either the first or the second analysis procedure;

wherein if link problems appear more frequently, the first analysis procedure is performed, and if file system problems appear more frequently, the second analysis procedure is performed.

2. The method of claim 1, wherein the first portion of the first file has a predetermined data size, and the time for accessing said first portion of the first file is predetermined.

3. The method of claim 1, wherein a time to access the first portion of the first file has a predetermined minimum duration, and the data amount during said accessing is predetermined.

4. The method of claim 1, wherein the expected value is obtained from at least one previously determined time for accessing a predetermined data amount of a file through the first link, or from at least one previously determined data amount for a file accessed during a specified time through the first link, or from at least one previously obtained access rate for accessing a file through the first link.

5. The method of claim 1, wherein if the difference from the comparing step does not exceed the predetermined threshold, then said first file accessed through said first link continues with the remaining portion of the first file.

6. The method of claim 1, wherein said accessing files is performed by a plurality of software threads, wherein each thread accesses one file, and further comprising a step of assigning each thread an associated link at the time of its execution.

7. The method of claim 1, wherein all file accesses are read accesses or all file accesses are write accesses.

8. The method according to claim 1, wherein the step of accessing the first file through the second link, on a condition that the first link is not preferable and the step of accessing the first file through a different link than the first link on a condition that the first link is not preferable are write accesses, and the other file accesses are read accesses.

9. An apparatus for accessing files stored in a storage access network (SAN), wherein the files are accessed through at least two different links to the storage access network, the apparatus comprising:
  first accessing module configured to access a first portion of a first file through a first link;
  a processor configured to determine the time for accessing said first portion of the first file and an amount of data accessed for the first portion of the first file;
  a comparator configured to compare the determined time, the determined amount of data or an access rate calculated from the determined time and determined data amount, with an expected value and provide an output indicative of said comparison;
  an analyzer configured to analyze if the output exceeds a predetermined threshold indicative of an unexpected long time, a low data amount or a low access rate, the analyzer comprising a first or second analysis module, wherein
  the first analysis module comprises:
    a second accessing module configured to access the first portion of the first file through a second link and a second processor for determining the time, amount of data or access rate for said accessing the first portion of the first file through the second link;
    a second comparator configured to determine whether accessing the first portion of the first file is faster through the second link or through the first link;
    a third accessing module configured to access the first file through the second link on a condition that said accessing the first portion of the first file is faster through the second link, and a first marker for marking the first link as not preferable; and
    a fourth accessing module for accessing the second file through the first link if said accessing the first portion of the first file is not faster through the second link, and a second marker for marking the first file as currently not accessible;
  wherein the second analysis module comprises:
    a fifth accessing module configured to access a first portion of a second file different from the first file through the first link, and a third processor configured to determine the time, amount of data or access rate for accessing said first portion of the second file through the first link;

a third comparator configured to determine whether said accessing the first portion of the second file or said accessing the first portion of the first file is faster through the first link;

a sixth accessing module configured to access the second or a further file through the first link if said accessing the first portion of the second file through the first link is faster, and a third marker for marking the first file as currently not accessible;

a seventh accessing module configured to access the first file through a different link than said first link if said accessing the first portion of the second file is not faster, and a fourth marker for marking the first link as not preferable;

a fourth processor configured to determine whether link problems or file system problems appear more frequently, and a fifth processor for determining, whether to perform the first or the second analysis procedure; and wherein if link problems appear more frequently, the first analysis module is used prior to the second analysis module, and if file system problems appear more frequently, the second analysis module is used prior to the first analysis module.

10. The apparatus of claim 9, wherein said file accessing is performed by a plurality of software threads, and wherein each thread accesses one file, and further comprising an associating module for assigning each thread an associated link at the time of its execution.

* * * * *